(12) United States Patent
Seo et al.

(10) Patent No.: US 11,184,789 B2
(45) Date of Patent: Nov. 23, 2021

(54) METHOD AND DEVICE FOR MEASURING AND REPORTING SIGNAL IN WIRELESS COMMUNICATION SYSTEM

(71) Applicant: LG Electronics Inc., Seoul (KR)

(72) Inventors: Inkwon Seo, Seoul (KR); Kijun Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 36 days.

(21) Appl. No.: 16/630,093

(22) PCT Filed: Jul. 31, 2018

(86) PCT No.: PCT/KR2018/008667
§ 371 (c)(1),
(2) Date: Jan. 10, 2020

(87) PCT Pub. No.: WO2019/027219
PCT Pub. Date: Feb. 7, 2019

(65) Prior Publication Data
US 2020/0162954 A1    May 21, 2020

Related U.S. Application Data

(60) Provisional application No. 62/540,521, filed on Aug. 2, 2017.

(51) Int. Cl.
*H04W 24/10* (2009.01)
*H04W 4/40* (2018.01)
(Continued)

(52) U.S. Cl.
CPC ........... *H04W 24/10* (2013.01); *H04L 1/0026* (2013.01); *H04L 5/0051* (2013.01);
(Continued)

(58) Field of Classification Search
CPC ......... H04W 24/10; H04W 4/40; H04W 8/24; H04W 56/001; H04W 72/042;
(Continued)

(56) References Cited

U.S. PATENT DOCUMENTS

2007/0173243 A1*  7/2007  Li .................... H04B 7/0613
                                                            455/422.1
2013/0286960 A1   10/2013  Li et al.
(Continued)

OTHER PUBLICATIONS

AT&T, "DL Beam Management Details", 3GPP TSG RAN WG1 Ad hoc Meeting #2, Jun. 26-30, 2017, R1-1710430.
(Continued)

*Primary Examiner* — Kiet Tang
(74) *Attorney, Agent, or Firm* — Dentons US LLP (57) ABSTRACT

A method for measuring and reporting a beam by means of a terminal in a wireless communication system according to an embodiment of the present invention may comprise the steps of: measuring a plurality of transmission beams for a physical downlink control channel (PDCCH) via at least one reception beam; determining at least one transmission beam to be reported to a base station, according to a result of measuring the plurality of transmission beams; and transmitting, to the base station, a measurement report including information relating to the determined at least one transmission beam, wherein the terminal identifies a reception beam applied to each of the determined at least one transmission beam, and reports an index of a synchronization signal block available through the identified reception beam, to the base station via the measurement report. The terminal is capable
(Continued)

of communicating with at least one of another terminal, a terminal related to an autonomous driving vehicle, the base station or a network.

11 Claims, 4 Drawing Sheets

(51) Int. Cl.
　　　*H04L 1/00*　　　　(2006.01)
　　　*H04L 5/00*　　　　(2006.01)
　　　*H04W 8/24*　　　　(2009.01)
　　　*H04W 56/00*　　　(2009.01)
　　　*H04W 72/04*　　　(2009.01)
(52) U.S. Cl.
　　　CPC ............. *H04L 5/0055* (2013.01); *H04W 4/40* (2018.02); *H04W 8/24* (2013.01); *H04W 56/001* (2013.01); *H04W 72/042* (2013.01); *H04W 72/046* (2013.01)
(58) Field of Classification Search
　　　CPC ............ H04W 72/046; H04W 72/0406; H04L 1/0026; H04L 5/0051; H04L 5/0055; H04L 5/0023; H04B 7/088; H04B 7/0695; H04B 7/0613
　　　See application file for complete search history.

(56) References Cited

U.S. PATENT DOCUMENTS

| 2017/0208494 | A1 | 7/2017 | Moon et al. | |
|---|---|---|---|---|
| 2017/0251460 | A1* | 8/2017 | Agiwal | ............. H04W 72/0406 |
| 2018/0288645 | A1* | 10/2018 | Lee | ....................... H04B 7/0695 |
| 2020/0228180 | A1* | 7/2020 | Zhang | ................... H04L 5/0023 |

OTHER PUBLICATIONS

Intel Corporation, "Multi-beam operation for NR PDCCH", 3GPP TSG RAN WG1 NR Ad-Hoc#2, Jun. 27-30, 2017, R1-1710545.
Samsung, "Mutlibeam Transmission for PDCCH", 3GPP TSG RAN WG1 NR Ad-Hoc#2, Jun. 27-30, 2017, R1-1710695.
Samsung, "Beam Management for PDCCH", 3GPP TSG RAN WG1 Meeting NR AH2, Jun. 27-30, 2017, R1-1711604.
ZTE Corporation, "Remaining issues on cell quality derivation from N beams", 3GPP TSG RAN WG2#NR_AdHoc#2, Jun. 27-29, 2017, R2-1706661.
R1-1710526: 3GPP TSG-RAN WG1 NR AdHoc #2, Qingdao, China, Jun. 27-30, 2017, "Details for DL Beam Management," Intel Corporation (13 Pages).

* cited by examiner

METHOD AND DEVICE FOR MEASURING AND REPORTING SIGNAL IN WIRELESS COMMUNICATION SYSTEM

This application is a National Stage Entry of International Application No. PCT/KR2018/008667 filed Jul. 31, 2018, which claims the benefit of U.S. Provisional Application No. 62/540,521 filed Aug. 2, 2017, all of which are hereby incorporated by reference in their entirety for all purposes as if fully set forth herein.

TECHNICAL FIELD

The present disclosure relates to a wireless communication system, and more particularly, to a method of measuring and reporting multiple transmission beams in a wireless communication system and device therefor.

BACKGROUND ART

Figure 1:
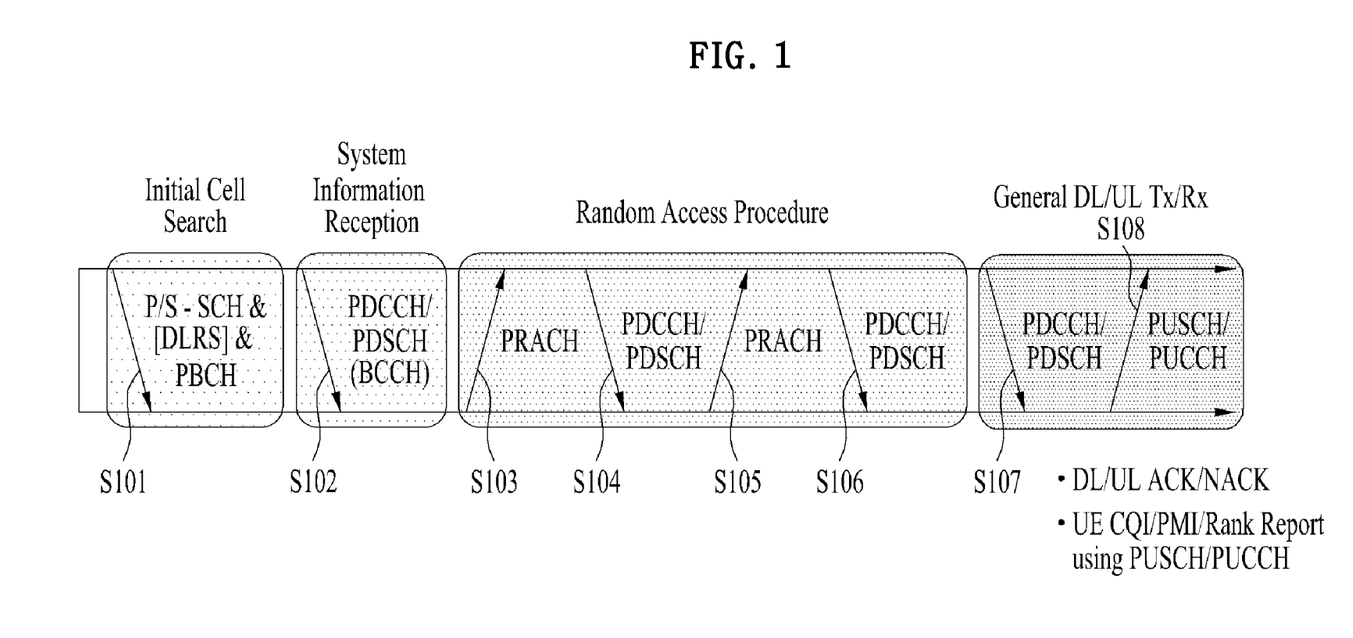
FIG. 1 illustrates physical channels used in a 3GPP LTE/LTE-A system and a general signal transmission method using the physical channels.

First, the existing 3GPP LTE/LTE-A system will be briefly described. Referring to FIG. 1, a user equipment (UE) performs an initial cell search (S101). In the initial cell search process, the UE receives a Primary Synchronization Channel (P-SCH) and a Secondary Synchronization Channel (S-SCH) from a base station (BS), performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

The object of the present disclosure is to provide a method by which a UE measures and reports multiple transmission beams to support multi-beam operation for a PDCCH signal in a wireless communication system and device therefor.

It is to be understood that both the foregoing general description and the following detailed description of the present invention are exemplary and explanatory and are intended to provide further explanation of the invention as claimed.

Technical Solution

In an aspect of the present disclosure, provided herein is a method of measuring and reporting a beam by a UE in a wireless communication system. The method may include: measuring multiple transmission beams for a PDCCH with one or two or more reception beams; determining at least one transmission beam to report to a BS based on results of measuring the multiple transmission beams; and transmitting a measurement report including information on the determined at least one transmission beam to the BS. The UE may identify a reception beam applied to each of the determined at least one transmission beam and report the index of a synchronization signal block available on the identified reception beam to the BS through the measurement report.

In another aspect of the present disclosure, provided herein is a UE for measuring and reporting a beam. The UE may include a transceiver; and a processor configured to control the transceiver to measure multiple transmission beams for a PDCCH with one or two or more reception beams, determine at least one transmission beam to report to a BS based on results of measuring the multiple transmission beams, and transmit a measurement report including information on the determined at least one transmission beam to the BS. The processor may be configured to identify a reception beam applied to each of the determined at least one transmission beam and report the index of a synchronization signal block available on the identified reception beam to the BS through the measurement report.

The UE may report, to the BS, UE capability related to the number of reception beams capable of being formed simultaneously.

When the number of reception beams capable of being formed simultaneously by the UE is 1, the at least one transmission beam to be reported by the UE may correspond to a transmission beam in excess of a threshold among transmission beams capable of being received through one reception beam.

When the number of reception beams capable of being formed simultaneously by the UE is equal to or more than 2, the at least one transmission beam to be reported by the UE may include multiple transmission beam sets respectively corresponding to different reception beams.

The UE may determine to report, to the BS, a transmission beam with quality higher than a threshold. In this case, the threshold may be determined depending on whether a resource for measurement is a synchronization signal block or a channel state information-reference signal (CSI-RS).

The measurement report may further include information on a reception beam paired with each of the determined at least one transmission beam.

The UE may receive a data signal scheduled by the PDCCH and transmit a message including ACK/NACK information for the data signal. The message may further include information on a transmission beam for transmitting a PDCCH capable of being received by the UE among the multiple transmission beams.

Advantageous Effects

According to an embodiment of the present disclosure, a UE may measure/report transmission beams suitable for PDCCH reception, and thus transmission beams to be used for multi-beam operation may be determined accurately and efficiently. In addition, since the multi-beam operation is applied to a PDCCH signal, the probability of success of PDCCH transmission and reception may increase, and diversity gain may also be obtained.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BEST MODE

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

<NR Frame Structure and Physical Resource>

In a new RAT (NR) system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu}=N_{symb}^{slot} \times N_{slot}^{subframe,\mu}$ contiguous OFDM symbols. $N_{symb}^{slot}$ represents the number of symbols per slot, μ represents OFDM numerology, and $N_{slot}^{subframe,\mu}$ represents the number of slots per subframe with respect to corresponding u. In NR, multiple OFDM numerologies shown in Table 1 below may be supported.

TABLE 1

| μ | Δf = $2^\mu$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, Δf refers to subcarrier spacing (SCS). μ and cyclic prefix with respect to a DL carrier bandwidth part (BWP) and u and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a set of contiguous physical resource blocks (PRBs). The carrier BWP may also be simply referred to a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information-reference signal (CSI-RS), or a tracking reference signal (TRS) out of the activated DL BWP. In addition, the UE may not be expected to receive a PUSCH or a PUCCH out of the activated UL BWP.

<NR DL Control Channel>

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource set (CORESET) and a search space (SS) are briefly described now. The CORESET may be a set of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

An eNB may signal information regarding a CORESET to a UE. For example, a CORESET configuration for each CORESET may be signaled to the UE, and the CORESET configuration may be signaled in time duration (e.g., 1/2/3 symbol) of the corresponding CORESET, a frequency domain resource of the corresponding CORESET, precoder granularity, an REG-to-CCE mapping type (e.g., interleaved/non-Interleaved), a REG bundling size and an interleaver size in the case of an interleaved REG-to-CCE mapping type, and so on.

When REG-to-CCE mapping with respect to 1-symbol CORESET is a non-interleaved type, 6 REGs with respect to a CCE are grouped to one REG bundle and all REGs of the corresponding CCE may be contiguous. When a plurality of CCEs is present in 1 PDCCH (e.g., when an aggregation level is equal to or greater than 2), CCEs may also be contiguous. A UE may assume the same precoding in 1 REG bundle or may assume the same precoding with respect to a plurality of REG bundles.

When REG-to-CCE mapping with respect to 1-symbol CORESET is an interleaved type, 2, 3, or 6 REGs may configure 1 REG bundle. For example, all REG bundle sizes of 2, 3, and 6 are not supported but, as a subset thereof, for example, an REG bundle size of {2}, {3}, {2,3}, {2,6}, {3,6}, or {2,3,6} may be supported. When an REG bundle size of {2, 6} is supported, 2 REGs may configure 1 REG bundle or 6 REGs may configure 1 REG bundle. A UE may assume the same precoding in 1 REG bundle or may assume the same precoding with respect to a plurality of REGs according to precoder granularity.

In the case of REG-to-CCE mapping with respect to a CORESET having duration of 2 symbols or greater, a REG bundle may be defined in time/frequency domain. When an REG bundle is defined in the time domain, all REGs belonging to 1 REG bundle may belong to the same RB and may correspond to different symbols. When an REG bundle is defined in the time-frequency domain, 1 REG bundle may include REGs belonging to different RBs as well as REGs that belong to the same RB and correspond to different symbols.

Time-first mapping may be supported for REG-to-CCE mapping with respect to a CORESET having duration of 2 symbols or greater. An REG bundle may be supported to be configured on the time domain in the same way as time domain duration of a CORESET. In the case of non-interleaved type, 6 REGs included in a CCE may correspond to 1 REG bundle and REGs of the corresponding CCE may be localized in the time/frequency domain. In the case of an interleaved type, 2, 3, or 6 REGs may correspond to 1 REG bundle and REG bundles may be bundled in a CORESET. A UE may assume the same precoding in 1 REG bundle or may assume the same precoding with respect to a plurality of REGs according to precoder granularity.

<Multi-Beam Operation for NR PDCCH>

In the NR system, multiple analog beams may be used for transmission and reception. To increase the reception quality of a signal transmitted on a specific analog beam, a UE may apply the best reception beam when receiving the signal.

Multiple beams may be used for a control channel. In particular, the introduction of control channel transmission and reception on multiple beams is considered for the following reasons.

First, in the case of the control channel, since there is no preprocessing for informing the control channel transmission and reception, it is difficult to perform a HARQ procedure on a data channel Thus, it may be required to obtain transmit diversity gain using multiple beams to avoid transmission and reception failure due to blockage.

Second, the transmission opportunity of the control channel needs to increase. In the case of a current NR control channel, one REG includes one symbol and one PRB (i.e., 12 REs including an RS). A CCE, which is the minimum transmission unit of the control channel, includes 6 REGs. Accordingly, a bandwidth of about 10 MHz is required to transmit control information at aggregation level 8 in one symbol. When multiple UEs prefer the same analog beam, control channel capacity may become insufficient. When there are multiple analog beams for the control channel, if the UE monitors the multiple analog beams, it is advantageous in that the flexibility of network beam scheduling is improved and the control channel capacity increases.

For the reasons above, multiple beams may be used for the control channel. Hereinafter, a description will be given of how a UE performs measurement and reporting regarding multi-beam operation for a control channel and feeds back information on a transmission beam.

Measurement and Report for Beam Selection

Synchronization signal (SS) block selection: During a synchronization procedure, a UE may select an SS block based on measurement results of a PSS/SSS, a PBCH (and/or a DMRS on the PBCH), etc. and perform initial access using initial access related information transmitted on the PBCH in the selected SS block.

Serving beam selection: When the UE selects an SS block suitable for the UE during an initial access procedure, the network may allocate multiple transmission beams to the UE based on the beam direction of the selected SS block (e.g., the transmission beams are indicated by SS block (SSB) indexes and/or CSI-RS ports) and instruct the UE to perform measurement/reporting to select a transmission beam (or a serving beam). If the UE is capable of forming multiple reception beams, the UE may perform the measurement using different reception beams for one same transmission beam. This operation may be referred to as beam management. After completing the initial access, the UE may perform the beam management periodically to determine its serving beam.

For convenience of description, it is assumed that each transmission beam is allocated as a CSI-RS port. When it is said that each transmission beam is allocated as the CSI-RS port, it may be interpreted to mean that a different CSI-RS port is allocated for each transmission beam. However, the present disclosure is not limited thereto, and a transmission beam may be specified by an SSB index and/or a transmission beam index.

The UE may report measurement results according to the following methods.

Transmission beams or transmission beam group: The UE may repot CSI-RS ports (e.g., CSI-RS ports in excess of a threshold) based on the measurement results. Alternatively, the UE may report a transmission beam group capable of being received through the same reception beam (e.g., a group of transmission beams in excess of the threshold when the UE performs reception/measurement using the same reception beam). When the UE reports multiple transmission beam sets, a BS may assume that each transmission beam set is received through a different reception beam.

Transmission/reception beam pair: Based on the measurement results, the UE may report transmission beams in excess of the threshold and reception beams respectively used when receiving the transmission beams. For example, the UE may report at least one reception beam and at least one transmission beam group capable of being received through the corresponding reception beam.

The measurement and reporting may be defined in different ways depending on the purpose of transmission beams or a transmission beam group. For example, the transmission beams or transmission beam group may be defined in the following ways: (i) to (iii). When the network supports the following definitions (i) to (iii), the network may signal to the UE which one of the definitions (i) to (iii) is applied.

When it is said that the UE is capable of simultaneously receiving multiple transmission beams, it may mean that the UE is capable of receiving the multiple transmission beams using the same reception beam or by simultaneously forming multiple reception beams (e.g., by matching a transmission beam and a reception beam). In the latter case, a reception beam may be reported together with a transmission beam for each sub-group of the transmission beam group.

(i) For example, the transmission beams reported by the UE may refer to a set of transmission beams capable of being received simultaneously in a specific CORESET.

(ii) As another example, the transmission beams reported by the UE may refer to a set of transmission beams capable of being received simultaneously by the UE on a specific time-domain resource (e.g., OFDM symbol). Meanwhile, the UE may report to the network the number of simultaneously applicable reception beams (e.g., in the form of UE capability). For example, the UE may report the number of simultaneously applicable reception beams and at the same time, report a transmission beam set capable of being received through each reception beam. Alternatively, the UE may report multiple preferred transmission beam sets, and in this case, each preferred transmission beam set may be received in different reception beam sets.

The transmission beams reported by the UE may be defined as follows depending on the number of reception beams that the UE is capable of applying simultaneously.

When the UE is capable of applying only one reception beam, a transmission beam set may be composed of transmission beams in excess of a threshold among transmission beams capable of being received through the corresponding reception beam When the UE is capable of applying two or more reception beams simultaneously, a transmission beam group may be reported for each reception beam. Alternatively, multiple transmission beam groups may be reported regardless of the reception beams. The network may use and determine a transmission beam group without consideration of which reception beam the UE uses, and the reception beam of the UE may be determined by UE implementation.

(iii) As a further example, the transmission beams reported by the UE may refer to a set of transmission beams capable of being received simultaneously by the UE on a specific time/frequency resource When the UE reports a set of transmission beams and the network is capable of using multiple transmission beams, the network may change the transmission beams in a UE-transparent way for UE multiplexing. Each UE may perform operation for a transmission beam associated therewith. For example, when the network signals that transmission beams #a and #b are available for a specific slot set, UE 1 monitoring transmission beam #a may use a reception beam suitable for transmission beam #a, and UE 2 monitoring transmission beam #b may use a reception beam suitable for transmission beam #b for the monitoring. In this case, the network may use either transmission beam #a or #b. Alternatively, when the network is capable of transmitting multiple transmission beams simultaneously, the network may use both transmission beams #a and #b. Although the network may use both transmission beams #a and #b, the network may inform each UE of a transmission beam that each UE needs to monitor.

As another example in which the network uses a UE's report on its transmission beam set, the network may use the UE's report on its transmission beam set in determining which CSS beam and which USS beam the network is capable of multiplex on one resource for a CORESET including both the CSS and the USS. In this case, an SSB may be quasi-co-located (QCLed) with a CSS transmission/ reception beam. For example, a transmission/reception beam used in the SSB may be used in the CSS in the same manner.

In this case, the UE may use a reception beam different from that used in general beam measurement. For example, when measuring a transmission beam, the UE may use a set of reception beams which the UE uses in monitoring an SSB. Thus, a CSI-RS corresponding to one transmission beam may be repeatedly transmitted such that the transmission beam is used for multiple reception beams. If the CSI-RS is transmitted such that it is monitored on the multiple reception beams and there are separate reception beams for measuring a transmission beam set, the UE may report to the network the number of times that the transmission beam is swept/repeated, which is necessary for the measurement, by considering the reception beams. Such a report may be related to a UE's report on its reception beam capability. The UE's report on its reception beam capability may be interpreted to mean that for the same CSI-RS, the UE requests the network to repeatedly transmit the CSI-RS at least as many times as the number of reception beams.

Considering that UE's measurement/reporting is for multi-beam operation for a control channel, the UE may operate as follows when measuring/reporting a transmission beam.

The UE may report a transmission beam of which the SINR exceeds a threshold.

The UE may assume a specific control channel and a specific resource (e.g., AL=4 and DCI size=60 bits) and report a transmission beam where the received block error rate (BLER) of the control channel exceeds a predetermined value.

The UE may report a transmission beam of which the RSRP is more than a threshold.

The UE may report a transmission beam of which the RSRQ is more than a threshold.

Meanwhile, a threshold used in measurement for beam sharing between the CSS/USS or a threshold used in measurement with respect to the SSB may vary as follows.

The UE may use a different threshold depending on whether the UE performs measurement for a transmission beam group with respect to an SSB or a CSI-RS resource. The UE may select its preferred beam by applying a different threshold depending on the granularity/resolution of a transmission beam to be measured. For example, a threshold used in CSS beam measurement may be different from that used in USS beam measurement. Specifically, since the CSS or SSB needs to be capable of covering multiple UEs, a relatively wide beam is used therefor. Thus, in this case, the threshold needs to be lower than that used in beam measurement for a specific UE.

When the UE measures a transmission beam group, the UE may configure a different threshold for each reception beam group. For example, the threshold may vary depending on whether a reception beam belongs to a reception beam set for beam management or a reception beam set for SSB monitoring.

In addition, when a hypothetical control channel is assumed, the UE may apply a different control channel and a different resource for each measurement RS and reception beam set. The reason for this is that the UE may have different quality standards for the CSS and the USS.

For example, when R1 denotes a reception beam set for beam management (e.g., a reception beam set applied to a CSI-RS, a TRS, etc.) and R2 denotes a reception beam set for SSB monitoring, the following options may be considered to measure/report a transmission beam group.

The transmission beam group measured and reported by the UE may refer to transmission beams capable of being received simultaneously through each reception beam in RE In this case, a CSI-RS for beam management may be reused to report the transmission beam group.

The transmission beam group measured and reported by the UE may refer to transmission beams capable of being received simultaneously through each reception beam in R2. The transmission beams may be transmitted on CSI-RS resources and/or in SSBs. In this case, CSI-RS transmission for measuring the transmission beam group needs to be performed separately from the beam management.

The transmission beam group measured and reported by the UE may be applied independently of R1 and R2. In addition, the measurement and reporting may be performed separately for each of R1 and R2.

The network may configure whether the UE needs to perform the measurement and reporting based on either or both R1 and R2.

According to an embodiment of the present disclosure, information on an SSB may be added to a UE's measurement report. For example, the UE may also report an SSB that the UE may receive though a reception beam used in receiving a transmission beam to be reported. When the UE reports a transmission beam group in excess of a threshold, the UE may additionally report the index of an SSB the UE is capable of receiving through a reception beam used in receiving the corresponding transmission beam group.

When the transmission period of an SSB increases, CSI-RS ports may be used to measure the SSB. In this case, two types of CSI-RS ports may be used for the beam management. For example, the two types of CSI-RS ports may include a Type-1 CSI-RS port (e.g., a CSI-RS port for SSB measurement) and a Type-2 CSI-RS port (e.g., a CSI-RS port for transmission beam measurement). The UE may perform measurement separately for each type of CSI-RS port, and measurement standards may also be separately configured.

The SSB information may be used to configure the CSS. The CSS may be used for transmission and reception of common control information or fallback operation for the USS. In this case, information needs to be provided to multiple UEs, and thus, a wide beam is required. That is, the beam needs to have a width suitable for the SSB.

Serving beam group selection: To prevent the occurrence of blockage during the use of an analog beam or increase the opportunity of transmitting and receiving a control channel, multiple transmission beams may be used for NR-PDCCH transmission and reception. In this case, multiple transmission beams for transmitting an NR-PDCCH to a specific UE may be defined as a serving beam group. The network may inform the UE whether a single or multiple transmission beams are used for a specific CORESET. When multiple transmission beams are used, the network may transmit the configurations of the multiple transmission beams to the UE. The transmission beam may be configured for each resource unit (e.g., a REG, a CCE, a candidate, a symbol, etc.).

When a serving beam group is defined, the definition of a serving beam may become narrower than that of the serving beam group. For example, the serving beam may refer to a specific transmission beam where CSI measurement is performed. When a control channel is transmitted, both UE-dedicated beamforming and precoder cycling may be applied to the serving beam However, for other beams in the serving beam group except the serving group, only the precoder cycling may be applied.

When multiple transmission beams are defined in one CORESET, the network may configure a different transmission beam to be assumed for each specific REG, CCE, candidate, and symbol. For different transmission beams, the UE may apply different reception beams.

When a transmission beam is distinguished for each symbol, multiple transmission beams may be used in the same CORESET regardless of UE capability (i.e., whether the UE is capable of simultaneously managing multiple reception beams). For example, when one control channel candidate is configured by combining REGs or CCEs located at different symbols, a different transmission beam may be used for each of the resources constituting the corresponding control channel candidate. The UE may receive the control channel candidate using an appropriate reception beam for each resource (e.g., symbol).

When a transmission beam is not distinguished for each symbol, the multi-beam transmission (operation) may be applied only when the UE is capable of simultaneously managing multiple reception beams. The UE may obtain one control channel candidate by extracting REGs, CCEs, and the like constituting a specific control channel candidate from a signal received through each reception beam.

The above features are summarized as follows. The UE may report its preferred transmission beam. For example, the UE may report at least one transmission beam group or at least one transmission/reception beam pair. In addition, the UE may report its capability on whether the UE is capable of applying reception beams simultaneously. If the UE is capable of applying one reception beam at a specific time instance, the UE may report a transmission beam group that the UE is capable of receiving through the corresponding reception beam (e.g., a transmission beam group in excess of a threshold after measurement based on the corresponding reception beam). Additionally, the UE may report a reception beam associated with its preferred transmission beam. If the UE is capable of applying multiple reception beams at a specific time instance, the UE may report transmission beam groups in excess of a threshold based on measurement results, which are made in combination of transmission and reception beams, with no reception beam. Alternatively, the UE may report a transmission beam group in excess of the threshold for each reception beam. Further, the UE may report SSB information. When the UE performs measurement using a CSI-RS, a TRS, etc., the UE may additionally report information on an SSB capable of being received through a reception beam associated with each transmission beam to be reported.

Feedback for Serving Beam Selection

According to an embodiment of the present disclosure, when the multi-beam operation is performed for a control channel and when the UE is capable of distinguishing between control information received through different beams, the UE may provide feedback information on whether the UE successfully decodes the control information. The network may determine a serving beam for the UE (or perform CSI acquisition) based on the received feedback information.

Figure 2:
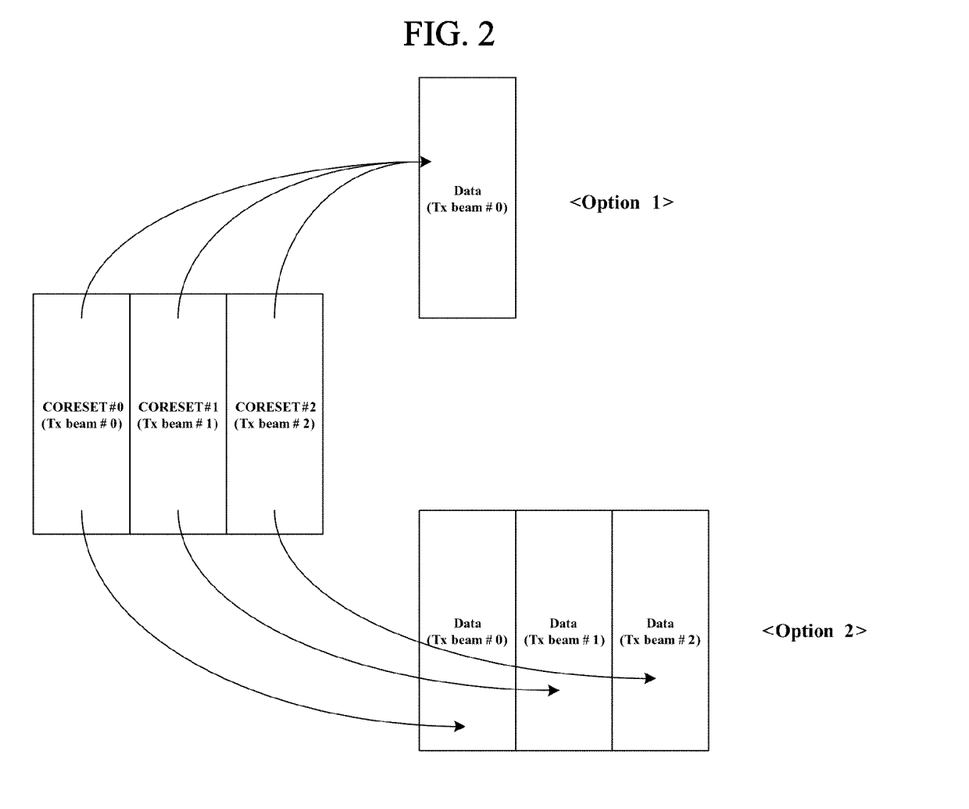
FIG. 2 is a diagram for explaining multi-beam operation for a control channel according to an embodiment of the present disclosure.

FIG. 2 is a diagram for explaining the multi-beam operation for a control channel according to an embodiment of the present disclosure. Specifically, FIG. 2 shows transmission or repeated transmission of a control channel on multiple beams and a data channel associated with the corresponding control channel.

Although the present disclosure assumes that a control channel is transmitted on each transmission beam for convenience of description, the disclosure is applicable when one control channel is divided and transmitted on multiple beams.

Referring to Option 1 of FIG. 2, the network may configure a CORESET for each transmission beam in a transmission time group and transmit the same control information in each CORESET. The UE may perform blind decoding of control channels in each CORESET and then decodes a data channel using the control information included in one or multiple control channels which are successfully decoded. The control information may be repeatedly transmitted on multiple transmission beams, but data may be transmitted on a single beam (e.g., a serving beam). For example, when the reception quality of transmission beam #0 is degraded, the UE may receive the control information through transmission beam #1 or #2. However, when the data is transmitted on transmission beam #0, the UE may not receive the data. In this case, the UE may attempt to receive the data, which the UE fails to receive, again through a HARQ process, etc.

Referring to Option 2 of FIG. 2, control information in a control channel transmitted in each CORESET may indicate a different data region, and in this case, each control channel and data associated therewith may be transmitted on the same transmission beam. Option 2 is advantageous in that the UE is capable of receiving both the control information and the data even when the UE successfully receives only one beam among beams in a serving beam group. However, many resources are required.

The UE may feed back information on control channel reception (e.g., information on a transmission and/or reception beam when the control channel reception is successful) to assist the network to determine a serving beam. The feedback may be interpreted to mean that beam management is initialized or reset.

When control information is transmitted based on the multi-beam operation and when the UE is capable of distinguishing between transmission beams, the UE may feed back information on a transmission beam associated with a successfully decoded control channel. For example, the transmission beam may be specified by various means such as a CORESET index, a transmission beam index, and/or CSI-RS port information.

When the network transmits a control channel on each transmission beam, the UE may report all transmission beams associated with successfully decoded control channels. Alternatively, the UE may report a transmission beam associated with a control channel with the best reception quality among the successfully decoded control channels.

When there is no data associated with a control channel (e.g., a PDCCH corresponding to a deactivation message for semi-persistent scheduling), an ACK/ACK resource may be defined for the control channel, which is transmitted on each transmission beam. In this case, the ACK/NACK resource may include not only a time/frequency-domain resource but also a UE's transmission beam. The network may determine a transmission beam most suitable for the UE based on the location of the ACK/NACK resource. The determination of the ACK/NACK resource and the transmission beam may be applied when the control channel is transmitted in each transmission beam as shown in FIG. 2 and data associated with the corresponding channel is transmitted.

The ACK/NACK resource may be implicitly or explicitly determined. For example, when the ACK/NACK resource is implicitly determined, the ACK/NACK resource may be determined by association with resource information (e.g., a starting CCE index, a candidate index, an REG index, etc.) used for control channel transmission. In the case of explicit signaling, multiple ACK/NACK resources may be pre-defined or configured by higher layer signaling, and then a specific ACK/NACK resource among the ACK/NACK resources may be indicated by DCI.

The ACK/NACK resource may include not only a time/frequency resource but also UE's transmission beam related information. When the UE performs ACK/NACK feedback, the UE may determine a time/frequency resource and a UL transmission beam for transmitting the corresponding ACK/NACK based on ACK/NACK resource information.

For example, in Option 1 of FIG. 2, the ACK/NACK resource for data may be determined by association with the transmission beam for a control channel Although the ACK/NACK information is for the same (or one piece of) data, the ACK/NACK resource may be determined by the transmission beam of the control channel scheduling the corresponding data. In other words, the ACK/NACK resource may be determined by the transmission beam used for transmitting control information which is successfully received, regardless of network's transmission beams used for transmitting data which is successfully received or not.

When control information is transmitted based on the multi-beam operation, information on a successfully decoded transmission beam may be included and reported in ACL/NACK information for data associated with a corresponding control channel. For example, when only one ACK/NACK resource is defined instead of defining an ACK/NACK resource for each transmission beam, the UE may transmit information about the transmission beam of a successfully decoded PDCCH (e.g., a transmission beam index, an associated CSI-RS port, a resource index (e.g., a CCE index, a candidate index)) together with ACK/NACK information.

When the UE fails to decode a control channel, the network may transmit the control channel by changing the serving beam group for the corresponding UE. The change of the serving beam group may be determined by the number of times that the network fails to receive ACK/NACK information. For example, it is assumed that the network transmits a control channel using multiple beams and fails to receive ACK/NACK information therefor. If such operation is repeated more than a predetermined number of times, the network may change the serving beam group to transmit the control channel. For the change of the serving beam group, the UE may measure and report multiple serving beam groups in advance.

Figure 3:
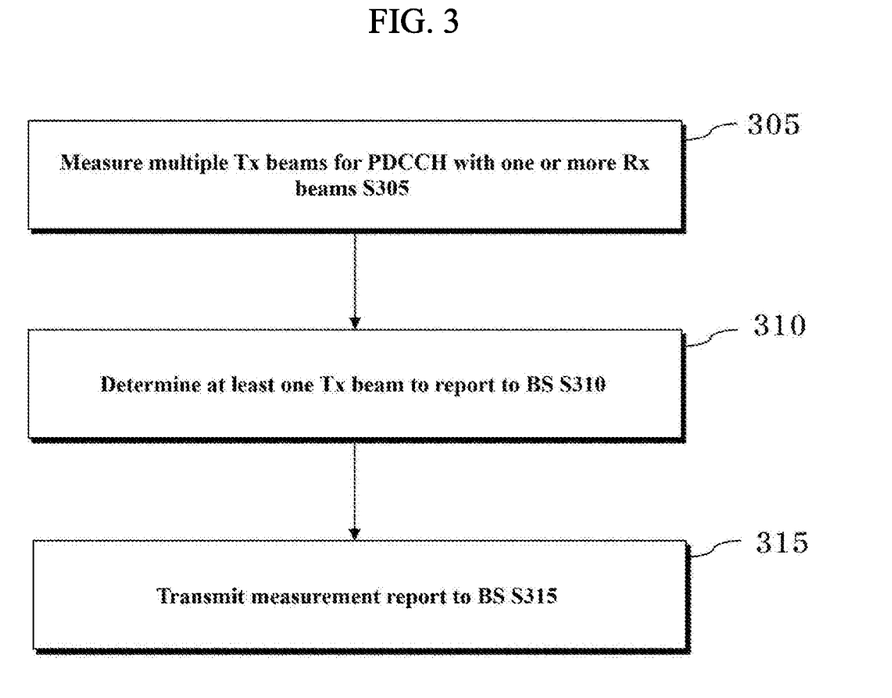
FIG. 3 is a flowchart illustrating a signal transmission and reception method according to an embodiment of the present disclosure.

FIG. 3 is a flowchart illustrating a signal transmission and reception method according to an embodiment of the present disclosure. FIG. 3 is an example for implementing the above-described embodiments, and thus, the present disclosure is not limited thereto. Redundant description will be omitted for clarity.

Referring to FIG. 3, a UE measures multiple transmission beams for a PDCCH with one or two or more reception beams (305).

The UE determines at least one transmission beam to report to a BS based on results of measuring the multiple transmission beams (S310). The UE may determine to report, to the BS, a transmission beam with quality higher than a threshold. For example, the threshold may be determined depending on whether a resource for measurement is an SSB or a CSI-RS.

The UE transmits a measurement report including information on the determined at least one transmission beam to the BS (315). The UE may identify a reception beam applied to each of the determined at least one transmission beam and report the index of an SSB available on the identified reception beam to the BS through the measurement report. The measurement report may further include information on a reception beam paired with each of the determined at least one transmission beam.

For example, the UE may report, to the BS, UE capability related to the number of reception beams capable of being formed simultaneously. When the number of reception beams capable of being formed simultaneously by the UE is 1, the at least one transmission beam to be reported by the UE may correspond to a transmission beam in excess of a threshold among transmission beams capable of being received through one reception beam. When the number of reception beams capable of being formed simultaneously by the UE is equal to or more than 2, the at least one transmission beam to be reported by the UE may include multiple transmission beam sets respectively corresponding to different reception beams.

For example, the UE may receive a data signal scheduled by the PDCCH and transmit a message including ACK/NACK information for the data signal. The message may further include information on a transmission beam for transmitting a PDCCH capable of being received by the UE among the multiple transmission beams.

Figure 4:
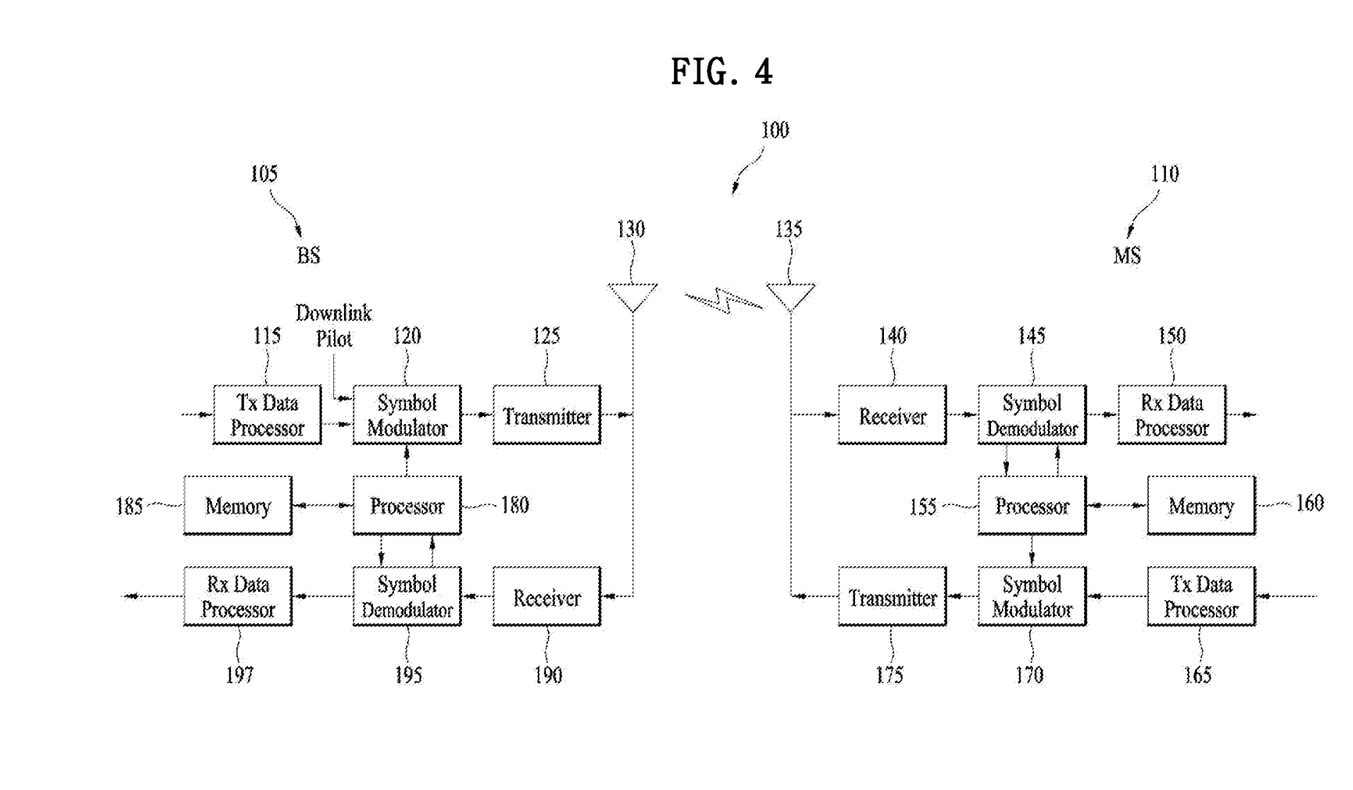
FIG. 4 illustrates a base station (BS) and a user equipment (UE) according to an embodiment of the present invention.

FIG. 4 is a block diagram showing a structure of a base station (BS) 105 and a UE 110 in a wireless communication system 100 according to an embodiment of the present invention. The structure of the BS 105 and the UE 110 of FIG. 4 are merely an embodiment of a BS and a UE for implementing the aforementioned method and the structure of a BS and a UE according to the present invention is not limited to FIG. 4. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS can be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the UE 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present disclosure is applicable to various wireless communication systems.

The invention claimed is:

1. A method of measuring and reporting a beam by a user equipment (UE) in a wireless communication system, the method comprising:

measuring multiple transmission beams for a physical downlink control channel (PDCCH) with one or more reception beams;

determining at least one transmission beam to report to a base station based on results of measuring the multiple transmission beams; and transmitting a measurement report including information on the determined at least one transmission beam to the base station, wherein the UE identifies a reception beam applied to each of the determined at least one transmission beam and reports an index of a synchronization signal block available on the identified reception beam to the base station through the measurement report, wherein based on a number of reception beams, capable of being formed simultaneously by the UE, being equal to 1, the at least one transmission beam to be reported by the UE corresponds to a transmission beam in excess of a threshold of transmission beams capable of being received through one reception beam, and wherein the threshold is determined based on a granularity or a resolution of the multiple transmission beams to be measured.

2. The method of claim 1, further comprising:

reporting, to the base station, UE capability related to the number of reception beams capable of being formed simultaneously by the UE.

3. The method of claim 2, wherein based on the number of the reception beams capable of being formed simultaneously by the UE being equal to or more than 2, the at least one transmission beam to be reported by the UE includes multiple transmission beam sets respectively corresponding to different reception beams.

4. The method of claim 1, wherein the measurement report further includes information on a reception beam paired with each of the determined at least one transmission beam.

5. The method of claim 1, further comprising:

receiving a data signal scheduled by the PDCCH; and transmitting a message including acknowledgement/negative-acknowledgement (ACK/NACK) information for the data signal, wherein the message further includes information on a transmission beam for transmitting a PDCCH capable of being received by the UE among the multiple transmission beams.

6. A user equipment (UE) for measuring and reporting a beam, the UE comprising:

a transceiver; and a processor configured to control the transceiver to measure multiple transmission beams for a physical downlink control channel (PDCCH) with one or more reception beams, determine at least one transmission beam to report to a base station based on results of measuring the multiple transmission beams, and transmit a measurement report including information on the determined at least one transmission beam to the base station, wherein the processor is further configured to identify a reception beam applied to each of the determined at least one transmission beam and report an index of a synchronization signal block available on the identified reception beam to the base station through the measurement report, wherein based on a number of reception beams, capable of being formed simultaneously by the UE, being equal to 1, the at least one transmission beam to be reported by the UE corresponds to a transmission beam in excess of a threshold of transmission beams capable of being received through one reception beam, and wherein the threshold is determined based on a granularity or a resolution of the multiple transmission beams to be measured.

7. The UE of claim 6, wherein the processor is configured to report, to the base station, UE capability related to the number of the reception beams capable of being formed simultaneously.

8. The UE of claim 7, wherein based on the number of the reception beams capable of being formed simultaneously by the UE being equal to or more than 2, the at least one transmission beam to be reported by the UE includes multiple transmission beam sets respectively corresponding to different reception beams.

9. The UE of claim 6, wherein the measurement report further includes information on a reception beam paired with each of the determined at least one transmission beam.

10. The UE of claim 6, wherein the processor is further configured to:

receive a data signal scheduled by the PDCCH; and transmit a message including acknowledgement/negative-acknowledgement (ACK/NACK) information for the data signal, wherein the message further includes information on a transmission beam for transmitting a PDCCH capable of being received by the UE among the multiple transmission beams.

11. The UE of claim 6, wherein the UE is capable of communicating with at least one of another UE, a UE related to an autonomous driving vehicle, a base station or a network.

* * * * *